United States Patent
Sase et al.

(10) Patent No.: US 11,333,580 B2
(45) Date of Patent: May 17, 2022

(54) ANOMALY DETECTING DEVICE, ANOMALY DETECTION METHOD AND PROGRAM

(71) Applicant: MITSUBISHI HEAVY INDUSTRIES, LTD., Tokyo (JP)

(72) Inventors: Ryo Sase, Tokyo (JP); Takaharu Hiroe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/156,830

(22) Filed: Jan. 25, 2021

(65) Prior Publication Data

US 2021/0247274 A1 Aug. 12, 2021

(30) Foreign Application Priority Data

Feb. 10, 2020 (JP) ............................. JP2020-020719

(51) Int. Cl.
*G06F 11/30* (2006.01)
*G01M 99/00* (2011.01)

(52) U.S. Cl.
CPC ................................ *G01M 99/005* (2013.01)

(58) Field of Classification Search
CPC .................................................. G01M 99/005
See application file for complete search history.

(56) References Cited

FOREIGN PATENT DOCUMENTS

JP 6115607 * 4/2017

\* cited by examiner

*Primary Examiner* — Phuong Huynh
(74) *Attorney, Agent, or Firm* — Wenderoth, Lind & Ponack, L.L.P.

(57) ABSTRACT

An anomaly detecting device includes: a singular value decomposition unit configured to perform singular value decomposition of a variance-covariance matrix of a measured value matrix $y_0$ composed of measured values acquired by a plurality of sensors in a time period considered to be normal, to thereby calculate a singular vector U and a singular value matrix S; an anomaly determination unit configured to apply the singular vector U and the singular value matrix S to a measured value matrix $y_t$ to be evaluated and which is acquired in an arbitrary time period to determine whether an anomaly is present from a result of application; and an anomalous part identification unit configured to, when the measured value matrix $y_t$ is determined to be anomalous, identify an anomalous part based on a diagonal element of a matrix obtained in association with the measured value matrix $y_t$.

8 Claims, 7 Drawing Sheets

ANOMALY DETECTING DEVICE, ANOMALY DETECTION METHOD AND PROGRAM

CROSS-REFERENCE TO RELATED APPLICATIONS

This application claims the benefit of priority to Japanese Patent Application Number 2020-020719 filed on Feb. 10, 2020. The entire contents of the above-identified application are hereby incorporated by reference.

TECHNICAL FIELD

The disclosure relates to an anomaly detecting device, an anomaly detection method and a program.

RELATED ART

The Mahalanobis-Taguchi (MT) method is widely used as a technique for detecting an anomaly. In the MT method, anomalies are determined at a Mahalanobis distance by taking into account normal measurement value variations.

SUMMARY

Detecting an anomaly in a mechanical system is difficult when the anomaly is only detected and the location at where the anomaly occurs is unknown. In a configuration with a large number of measuring points, a large number of locations may be anomalous, and thus it is inefficient to check for anomalies one by one.

When detecting an anomaly in a mechanical system, it is easy to identify the signal being measured as location identification. For example, the effect on the degree of anomaly can be measured based on, for example, the SN ratio of the MT method. Japanese Patent Publication No. 6115607 discloses a method for identifying a variable that has a large effect on Mahalanobis distance to identify the cause of an anomaly. This method determines the Mahalanobis distance, which is a scalar value, from N-dimensional measurement data, as in a general MT method.

When only anomaly detection is performed, it is effective to reduce the dimension of high dimensional signal data to the Mahalanobis distance, which is a scalar value. On the other hand, because the Mahalanobis distance, which is a scalar value, is calculated from the N-dimensional measurement data, it is inevitable that the amount of information decreases. Thus, it is assumed that accuracy when identifying an anomalous part is inferior compared to a case where all of the N-dimensional measurement data is used.

An object of the present disclosure is to identify an anomalous part with high accuracy.

According to a first aspect of the present disclosure, an anomaly detecting device that detects an anomaly of an object by referring to a measured value acquired by a plurality of sensors includes: an anomaly determination unit configured to determine whether the anomaly is present for a measured value matrix $y_t$ to be evaluated and which is acquired in an arbitrary time period; and an anomalous part identification unit configured to, when it is determined that the measured value matrix $y_t$ is anomalous, identify an anomalous part based on a diagonal element of a matrix obtained in association with the measured value matrix $y_t$.

According to the present disclosure, the anomalous part can be identified with high accuracy.

BRIEF DESCRIPTION OF DRAWINGS

The disclosure will be described with reference to the accompanying drawings, wherein like numbers reference like elements.

DESCRIPTION OF EMBODIMENTS

First Embodiment

Hereinafter, an anomaly detecting device according to a first embodiment of the present disclosure will be described with reference to FIGS. 1 to 6.

Overall Configuration of Anomaly Detecting Device

Figure 1:
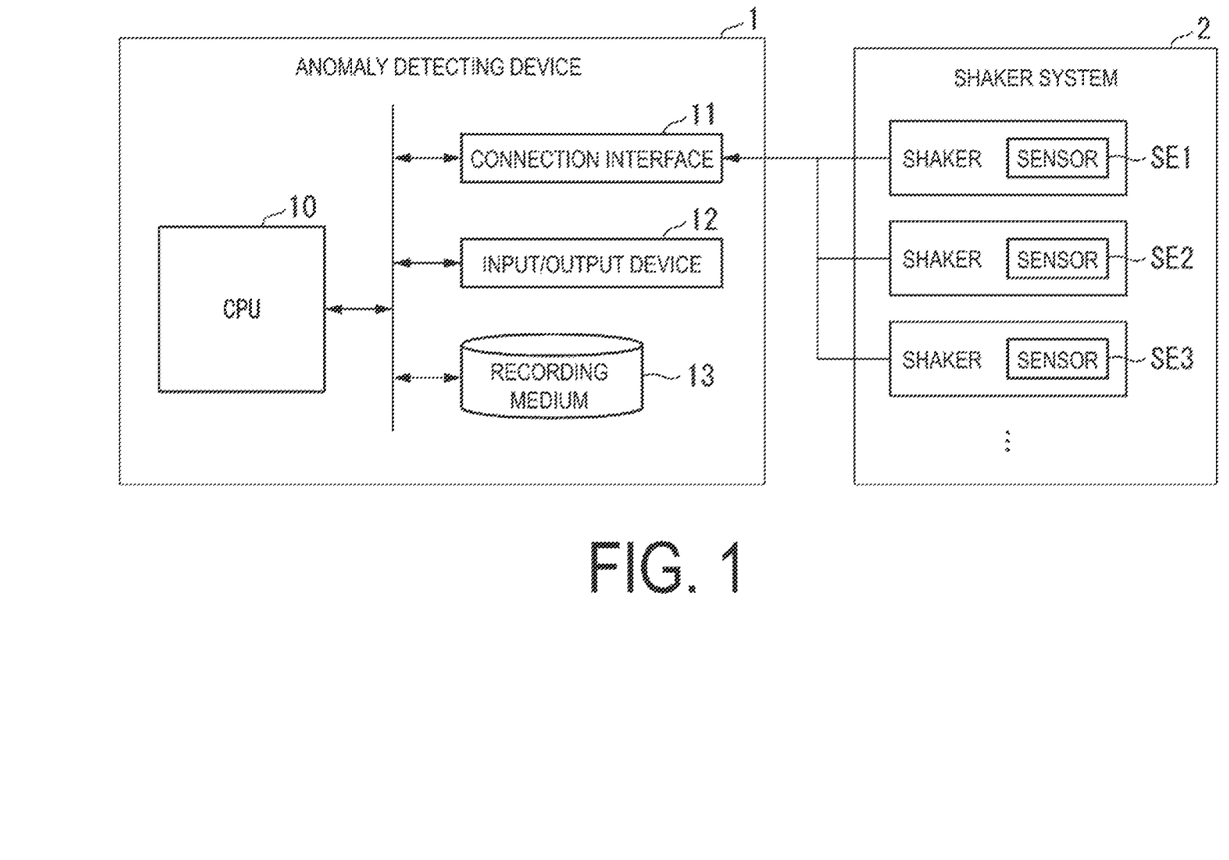
FIG. 1 is a diagram illustrating an overall configuration of an anomaly detecting device according to a first embodiment.

FIG. 1 is a diagram illustrating an overall configuration of the anomaly detecting device according to the first embodiment.

As illustrated in FIG. 1, the anomaly detecting device 1 according to the present embodiment is described as using a shaker system 2 composed of a plurality of shakers as the subject of anomaly detection. The plurality of shakers constituting the shaker system 2 are, for example, hydraulic shakers, and the shaker system 2 is used to test the vibration of a structure to be tested. A vibration test is performed by repeatedly applying a predetermined vibration pattern to the structure. As illustrated in FIG. 1, in the shaker system 2, each shaker is provided with a sensor SE1, SE2, and SE3, . . . , which is a stroke sensor.

The anomaly detecting device 1 sequentially acquires a stroke length from each of the sensors SE1, SE2, . . . provided in the shaker system 2. The anomaly detecting device 1 according to the present embodiment detects an anomaly of the shaker system 2 based on a measured value of the stroke length acquired from each of the sensors SE1, SE2, . . . .

Now, a hardware configuration of the anomaly detecting device 1 will be described.

As illustrated in FIG. 1, the anomaly detecting device 1 includes a CPU 10, a connection interface 11, an input/output device 12, and a recording medium 13.

The CPU 10 is a processor that exhibits various functions according to a predetermined program.

The connection interface 11 is a connection interface with each of the sensors SE1, SE2, . . . .

The input/output device 12 is an input/output device such as a mouse, a keyboard, a display, or a speaker.

The recording medium 13 is a so-called auxiliary storage device and is a mass storage device such as a hard disk drive (HDD) or a solid state drive (SSD).

Functional Configuration of Anomaly Detecting Device

Figure 2:
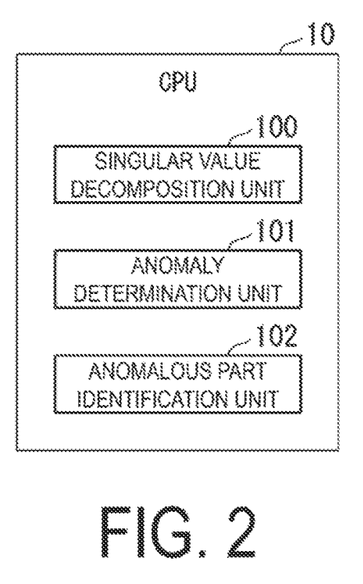
FIG. 2 is a diagram illustrating a functional configuration of the anomaly detecting device according to the first embodiment.

FIG. 2 is a diagram illustrating a functional configuration of the anomaly detecting device according to the first embodiment.

As illustrated in FIG. 2, the CPU 10 of the anomaly detecting device 1 operates according to a predetermined program to exhibit functions as a singular value decomposition unit 100, an anomaly determination unit 101, and an anomalous part identification unit 102.

The singular value decomposition unit 100 performs singular value decomposition of a variance-covariance matrix of a measured value matrix $y_0$ composed of the measured values of the stroke lengths acquired in a time period considered to be normal, and calculates a singular vector U and a singular value matrix S. The anomaly determination unit 101 applies the singular vector U and the singular value matrix S to a measured value matrix $y_t$ to be evaluated and which is acquired in an arbitrary time period, and determines whether an anomaly is present from the result of this application.

When the anomaly determination unit 101 determines that the measured value matrix $y_t$ is anomalous, the anomalous part identification unit 102 identifies an anomalous part based on a diagonal element of a matrix obtained in association with the measured value matrix $y_t$. In the present embodiment, as will be described later, the anomalous part identification unit 102 identifies an anomalous part based on the diagonal element of a matrix X represented by $y_t = X \cdot y_0$.

Processing Flow of Anomaly Detecting Device

Figure 3:
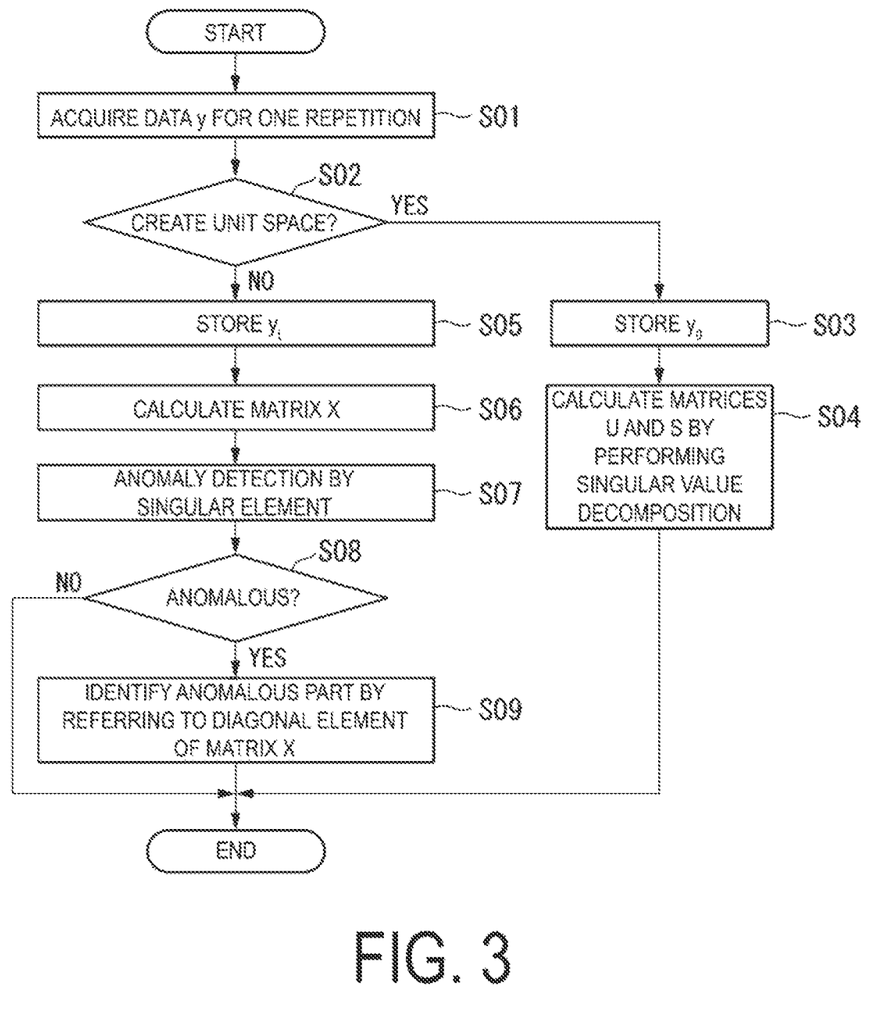
FIG. 3 is a diagram illustrating a processing flow of the anomaly detecting device according to the first embodiment.

FIG. 3 is a diagram illustrating a processing flow of the anomaly detecting device according to the first embodiment.

Figure 4:
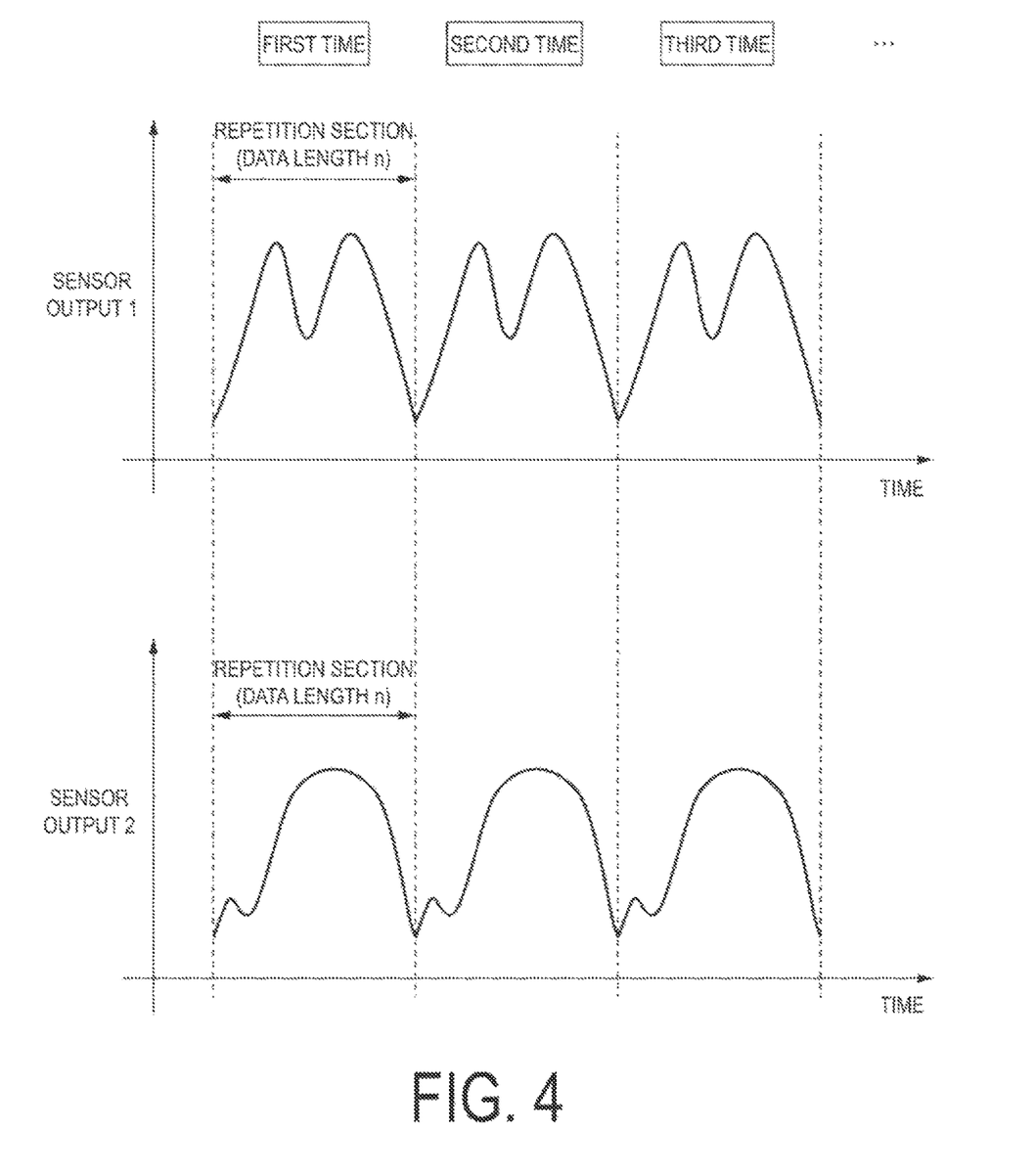
FIG. 4 is an explanatory diagram of the processing performed by the anomaly detecting device according to the first embodiment.
Figure 5:
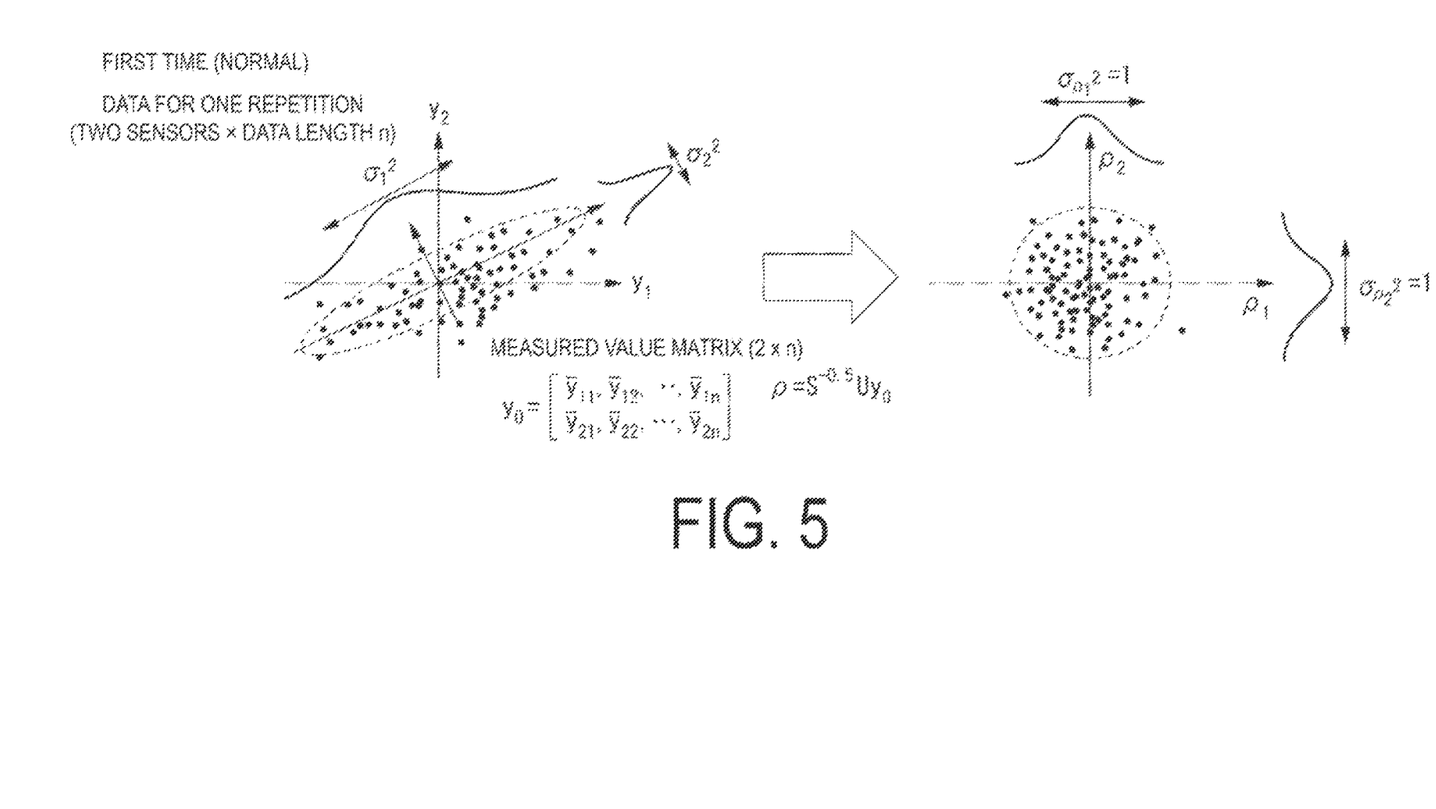
FIG. 5 is an explanatory diagram of the processing performed by the anomaly detecting device according to the first embodiment.
Figure 6:
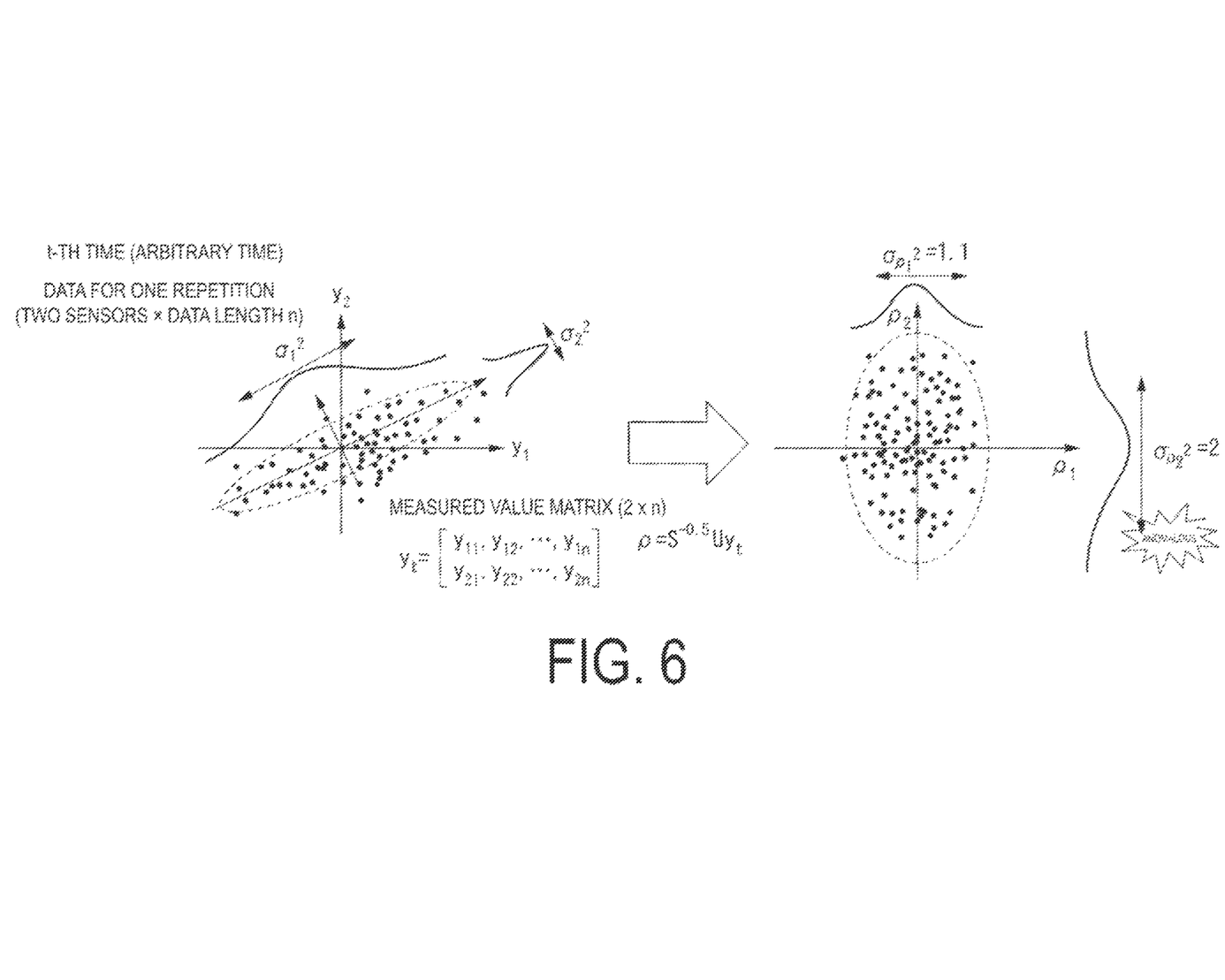
FIG. 6 is an explanatory diagram of the processing performed by the anomaly detecting device according to the first embodiment.

FIGS. 4 to 6 are explanatory diagrams of the processing performed by the anomaly detecting device according to the first embodiment.

The processing flow illustrated in FIG. 3 is repeatedly executed from the start of a vibration test performed on a structure by using the shaker system 2 described above.

As illustrated in FIG. 3, first, the anomaly detecting device 1 acquires, from the plurality of sensors SE1, SE2, ..., a first data y of a repetition section in the vibration test (step S01). In the following description, the data y used to create a unit space is denoted as data $y_0$, and any data y to be actually evaluated is denoted as data $y_t$ for distinguishing from the data $y_0$.

FIG. 4 illustrates an example of data output from the respective sensors SE1, SE2, .... As illustrated in FIG. 4, the anomaly detecting device 1 acquires, from the respective sensors SE1, SE2, ..., data (sensor outputs 1, 2, ...) for each predetermined repetition section (a data length n), and acquires a set of this data as the data y. That is, the data y is represented by a determinant of a number m of sensors × the data length n.

Next, the anomaly detecting device 1 determines whether to create a unit space (step S02). In the present embodiment, in the repetitive vibration in the vibration test, the first data y ($y_0$) is considered to be normal data, and this normal data is used to create a unit space.

When the anomaly detecting device 1 creates the unit space, that is, when the acquired data y is the first data $y_0$ in the repetition section (step S02; YES), the anomaly detecting device 1 stores the data $y_0$ in the recording medium 13 (step S03).

Subsequently, the singular value decomposition unit 100 of the anomaly detecting device 1 performs singular value decomposition on the data $y_0$, and calculates the singular vector U and the singular value matrix S (step S04).

The processing in step S04 will be described with reference to FIG. 5. Note that FIG. 5 illustrates an example of a case in which the number of sensors is two for the sake of simplicity. As illustrated in FIG. 5, the singular value decomposition unit 100 determines the singular vector U and the singular value matrix S that satisfy the equation of $p = S^{-0.5} U y_0$. Here, $\rho$ is represented by coordinate axes ($\rho_1, \rho_2$) along a $y_0$ distribution direction, and is data of each axial variance represented by a normalized coordinate system. The singular vector U is a vector for converting (rotating) the data $y_0$ from a coordinate system of coordinate axes $y_1, y_2$ indicating data values to a coordinate system of the coordinate axes $\rho_1, \rho_2$ along the distribution direction of the data $y_0$. In addition, the singular value matrix S is a matrix defined by variance in each of a $\rho_1$ direction and a $\rho_2$ direction. Variances $\sigma_{\rho1}^2$ and $\sigma_{\rho2}^2$ of the $\rho_1$ direction and the $\rho_2$ direction, respectively, are normalized ($\sigma_{p1}^2 = 1$ and $\sigma_{p2}^2 = 1$) in the unit space by $S^{-0.5}$. The coordinate system represented in this manner is a unit space of the Mahalanobis distance. The anomaly detecting device 1 stores the singular vector U and the singular value matrix S calculated in this manner.

Returning to FIG. 3, when the anomaly determination of the shaker system 2 is performed, that is, when the acquired data y is second and subsequent data $y_t$ from the first data in the repetition section (step S02; NO), the anomaly detecting device 1 stores the data $y_t$ in the recording medium 13 (step S05).

Next, the anomaly determination unit 101 calculates the matrix X represented by $y_t = X \cdot y_0$, which is a matrix determined in association with the measured value matrix $y_t$ (step S06).

The matrix X will now be described in detail.

When a matrix of the measured values measured at an arbitrary time is $y_1$, the relationship between the measured values $y_1$ and a singular value $\rho_1$ is represented as in Equation (1).

[Equation 1]

$$y_1 = US^{0.5}\rho_1 \tag{1}$$

Where, assuming that the singular value $\rho_1$ remains as $\rho_0$ (state in which the shaker system 2 is normal), a characteristic of the shaker system 2 changes from U to XU. When the measured value changes from $y_0$ to $y_1$, $y_1$ is represented as in the following Equation (2).

[Equation 2]

$$\begin{aligned} y_1 &= US^{0.5}\rho_1 \\ &= XUS^{0.5}\rho_0 \\ &= Xy_0 \end{aligned} \tag{2}$$

However, X cannot be determined from Equation (2). As a result, covariance is considered. Considering a covariance matrix of $y_1$ defined using $y_1 = Xy_0$, Equation (3) is as follows.

[Equation 3]

$$y_1 y_1^T = (X y_0)(X y_0)^T \qquad (3)$$
$$= X y_0 y_0^T X^T$$

The matrix X is solved to identify the anomalous part. That is, when the measured values of the shaker system 2 change from $y_0$ to $y_1$, the matrix X is obtained to match the covariance matrix of $y_1$ with the covariance matrix of $y_0$.

Assuming the matrix X as a target matrix, Equation (4) is obtained from Equation (3).

[Equation 4]

$$X y_0 y_0^T X = y_1 y_1^T \qquad (4)$$

When multiplying $y_0^T$ from the left and $y_0$ from the right in Equation (4), Equation (5) is obtained.

[Equation 5]

$$y_0^T X y_0 y_0^T X y_0 = y_0^T y_1 y_0 y_1^T y_0 \qquad (5)$$

Where $X=X^T$ is assumed, Equation (5) can thus be deformed as Equation (6).

[Equation 6]

$$(y_0^T X y_0)(y_0^T X y_0)^T = y_0^T y_1 y_1^T y_0 \qquad (6)$$

$y_0^T X y_0$ is also a target matrix. Since $y_0^T X y_0 = (y_0 X y_0)^T$, Equation (7) is obtained.

[Equation 7]

$$y_0^T X y_0 = \mathrm{sqrtm}(y_0^T y_1 y_1^T y_0) \qquad (7)$$

A=sqrtm(B) is a function obtained by determining a matrix A that satisfies B=A*A for matrices A and B. If multiplying $y_0$ from the left and $y_0^T$ from the right, the following Equation (8) is obtained.

[Equation 8]

$$y_0 y_0^T X y_0 y_0^T = y_0 \mathrm{sqrtm}(y_0^T y_1 y_1^T y_0) y_0^T \qquad (8)$$

Therefore, the matrix X is obtained from the following Equation (9) by multiplying $(y_0 y_0^T)^{-1}$ from the left and right.

[Equation 9]

$$X = (y_0 y_0^T)^{-1} y_0 \mathrm{sqrtm}(y_0^T y_1 y_1^T y_0) y_0^T (y_0 y_0^T)^{-1} \qquad (9)$$

Next, the anomaly determination unit 101 performs anomaly detection by using a singular element for the measured value matrix $y_t$ (step S07). The processing in step S07 will be described with reference to FIG. 6.

Note that as in FIG. 5, FIG. 6 illustrates an example of a case in which the number of sensors is two for the sake of simplicity. As illustrated in FIG. 6, the anomaly determination unit 101 applies the singular vector U and the singular value matrix S calculated in step S04 by the singular value decomposition unit 100 to the measured value matrix $y_t$, and computes $p = S^{-0.5} U y_t$. Thus, the characteristic of the measured value matrix $y_t$ can be compared with the unit space. As a result, the anomaly determination unit 101 determines that an anomaly is present when either one of the variances $\sigma_{\rho 1}^2$ and $\sigma_{\rho 2}^2$ corresponding to the measured value matrix $y_t$ is greater than 1 (greater than or equal to a predetermined threshold). In the example illustrated in FIG. 6, although the variance $\sigma_{\rho 1}^2$ has little change ($\sigma_{\rho 1}^2 = 1.1$), the anomaly determination unit 101 determines that an anomaly is present because the variance $\sigma_{\rho 2}^2$ is substantially greater than 1 ($\sigma_{\rho 2}^2 = 2$).

Returning to FIG. 3, when it is determined that no anomaly has occurred (step S08; NO) as a result of step S07, the anomalous part identification unit 102 ends the processing without identifying the anomalous part.

On the other hand, when it is determined that an anomaly has occurred (step S08; YES) as a result of step S07, the anomalous part identification unit 102 identifies the anomalous part by using the matrix X obtained in step S06 (step S09).

Here, when the two sensors SE1 and SE2 are provided, based on the relationship of $y_t = X y_0$, the matrix X is a 2×2 matrix that represents a relationship between the measured value matrix $y_0$ (see FIG. 5) and the measured value matrix $y_t$ (see FIG. 6). Thus, when an anomaly has not occurred in either of the sensors SE1 or SE2 and each of the measured value matrices $y_0$ and $y_t$ have substantially equal values, the matrix X is a value close to a unit matrix where the diagonal element is 1 and the other element is 0.

On the other hand, at the time when the measured value matrix $y_t$ is acquired, for example, it is assumed that an anomaly has occurred in the sensor (sensor SE1) that acquired a value in the first row of each of the measured value matrices $y_0$ and $y_t$. In this case, the first row of the measured value matrix $y_0$ and the first row of the measured value matrix $y_t$ are likely to have largely different values, and thus only the diagonal element in the first row and the first column of the matrix X can fluctuate to a value far from 1.

Similarly, at the time when the measured value matrix $y_t$ is acquired, assuming that an anomaly has occurred in the sensor (sensor SE2) that acquired a value in the second row of each of the measured value matrices $y_0$ and $y_t$, only the diagonal element of the second row and second column in the matrix X can be fluctuate to a value far from 1.

In this way, a sensor in which an anomaly has likely occurred can be identified by referring to which of the diagonal elements of the matrix X has a value far from 1.

With the anomaly detecting device 1 according to the first embodiment, the anomalous part can be identified with high accuracy based on the diagonal element of the matrix X representing the relationship between the measured value matrix $y_0$ and the measured value matrix $y_t$.

Modifications of First Embodiment

The anomaly detecting device 1 according to the first embodiment described above may have the following aspects.

That is, the anomalous part identification unit 102 according to a modification of the first embodiment derives a degree of anomaly of each sensor based on a past matrix X, ranks the sensors in order of the degree of anomaly, and determines whether each sensor is anomalous in this order.

According to the processing flow (FIG. 3) in the first embodiment, even when the anomaly determination unit 101 does not perform anomaly determination (step S08; NO), the anomalous part identification unit 102 calculates the matrix X for all of the measured value matrices $y_t$ acquired in step S01 (step S06). Thus, when the anomaly determination unit 101 performs the anomaly determination (step S08; YES), the anomalous part identification unit 102 according to the present modification calculates the degree of anomaly of each sensor with reference to the diagonal element of the past 10 matrices X for which a normal determination has been performed, in addition to the diagonal element of the current matrix X for which an anomaly is determined. Then, the anomalous part identification unit 102 identifies the anomalous part based on the order of the degree of anomaly.

For example, the anomalous part identification unit 102 determines that the sensor SE1 is faulty when the sensor SE1 ranks first in the degree of anomaly 10 consecutive times upon referring to the diagonal elements of the past 10 matrices X. In this case, the anomalous part identification unit 102 may test the hypothesis that the sensor SE1 ranks first in the degree of anomaly 10 consecutive times in a binomial test to calculate reliability of this hypothesis.

As described above, the anomalous part identification unit 102 refers to a plurality of the matrices X acquired before it is determined that the measured value matrix $y_t$ is anomalous to determine the anomalous part. In this way, the anomalous part can be identified with higher accuracy because the anomalous part is also identified based on a precursor before an anomaly is detected.

In a further modification, the anomalous part identification unit 102 may group the sensors SE1, SE2, . . . by rank. For example, as a result of referring to the past 10 matrices X, when the two sensors SE1 and SE2 always rank first and second in the degree of anomaly, the sensors SE1 and SE2 are handled and determined as one group. As a result, the anomalous part identification unit 102 can send an early notification of a diagnosis that "sensor SE1 or sensor SE2 is faulty".

In other modifications of the first embodiment, a diagonal element of log m (X) may be a degree of anomaly for the matrix X. Alternatively, an absolute value of the diagonal element of log m (X) may be a degree of anomaly for the matrix X.

As a result, each diagonal element of the matrix X can handle the degree of separation from 1 in a direction increasing from 1 and a degree of separation from 1 in a direction decreasing from 1 on the same scale.

Note that the anomaly detecting device 1 according to the first embodiment has been described as performing anomaly detection based on whether the variances $\sigma_{\rho 1}^2$ and $\sigma_{\rho 2}^2$ corresponding to the measured value matrix $y_t$ are significantly greater than 1 to act as a unit that performs the anomaly detection in step S08. However, other embodiments are not limited to this aspect. For example, the anomaly detecting device 1 according to another embodiment may perform the anomaly detection using a typical MT method, or may perform the anomaly detection with other common methods. In other words, the anomaly detecting device 1 according to another embodiment may not include the singular value decomposition unit 100.

Second Embodiment

Hereinafter, an anomaly detecting device according to a second embodiment of the present disclosure will be described with reference to FIG. 7.

Processing Flow of Anomaly Detecting Device

Figure 7:
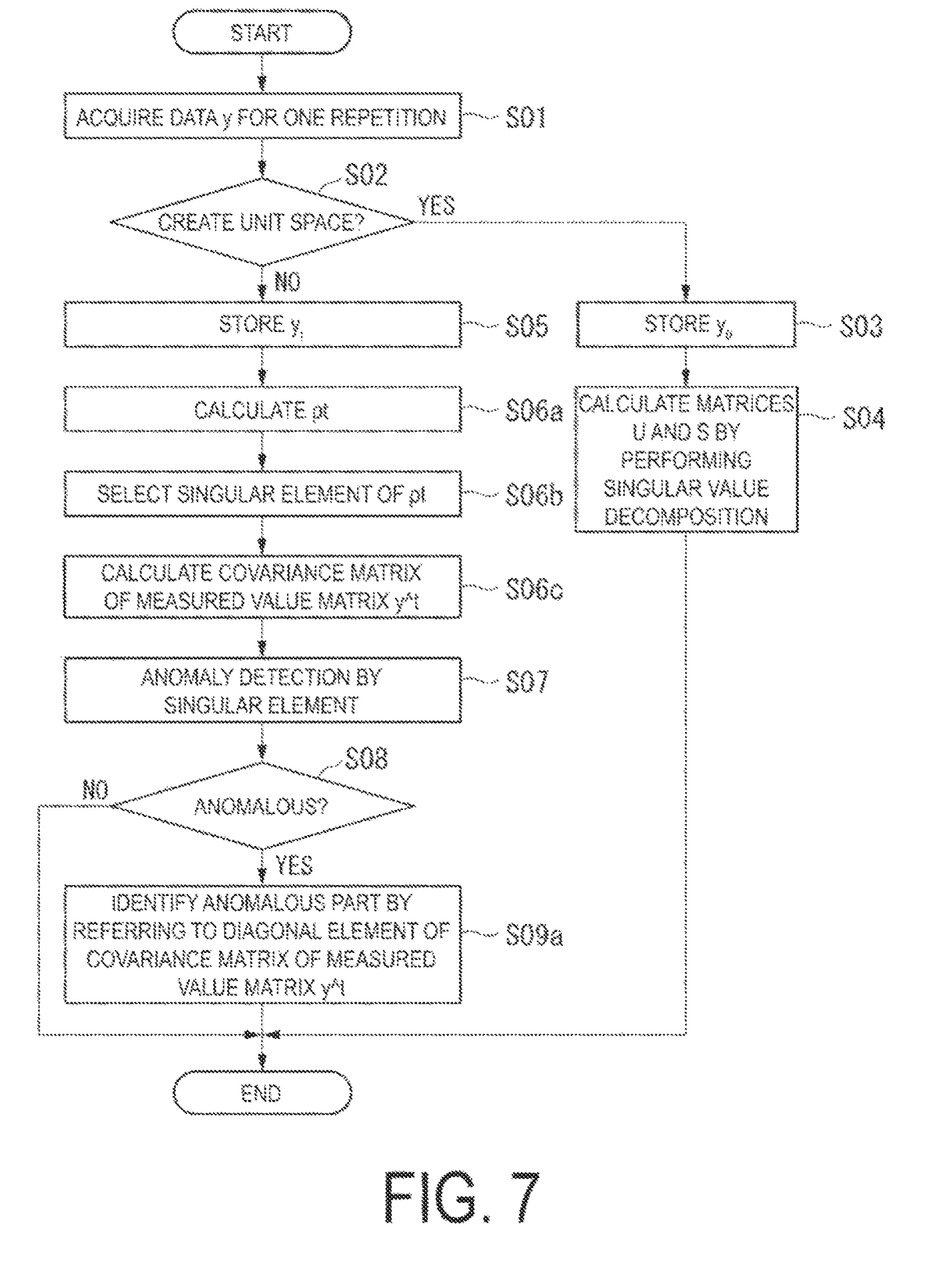
FIG. 7 is a diagram illustrating a processing flow of an anomaly detecting device according to a second embodiment.

FIG. 7 is a diagram illustrating a processing flow of the anomaly detecting device according to the second embodiment.

The processing flow illustrated in FIG. 7 differs from the first embodiment (FIG. 3) in that the processing flow illustrated in FIG. 7 includes steps S06a to S06c and a step S09a. Hereinafter, the steps S06a to S06c and S09a will be described in detail.

The anomalous part identification unit 102 computes $\rho_t = S^{-0.5} U y_t$ for the measured value matrix $y_t$ acquired in step S01 to acquire a singular element matrix $\rho_t$ corresponding to the measured value matrix $y_t$ (step S06a). Here, similar to the measured value matrix $y_t$, the singular element matrix $\rho_t$ is represented by a determinant of the number in of singular elements x the data length n (the number in of singular elements is the same number as the number m of sensors).

Next, the anomalous part identification unit 102 selects some of the singular elements $\rho_1, \rho_2, \ldots$, that is, row elements (lateral direction) that constitute the singular element matrix $\rho_t$ in accordance with predetermined criterion (described below), and deletes other singular elements (row elements) (step S06b).

Here, a group of element numbers selected according to the predetermined criterion is represented as $\{j\}$. In this case, $\rho_{\{j\}}$ can be represented as in the following Equation (10).

[Equation 10]

$$\rho_{\{j\}} = S_{\{j\}}^{-0.5} U_{\{j\}}^T y_t \tag{10}$$

Here, for example, assuming that three elements of $\{j\} = \{1, 3, 5\}$ are present, $\rho_{\{j\}}$ is a matrix in which only $\rho_1$ (first row), $\rho_3$ (third row), and $\rho_5$ (fifth row) in each of the singular elements (row elements $\rho_1, \rho_2, \ldots$) constituting the singular element matrix $\rho_t$ remain, and information on other singular elements is excluded.

Assuming that $y_t$ obtained by calculating $\rho_t = S^{-0.5} \cdot U^T \cdot y_t$ backward from $\rho_{\{j\}}$ is $\hat{y}_t$, U is an orthogonal matrix, and thus $\hat{y}_t$ can be obtained from Equation (11).

[Equation 11]

$$\hat{y}_t = U_{\{j\}} S_{\{j\}}^{0.5} \rho_{\{j\}} \tag{11}$$

The anomalous part identification unit 102 computes the $\hat{y}_t$ covariance matrix as in Equation (12) (step S06c).

[Equation 12]

$$E[\hat{y}_t \hat{y}_t^T] = \frac{U_{\{j\}} S_{\{j\}}^{0.5} \rho_{\{j\}} \rho_{\{j\}}^T S_{\{j\}}^{0.5} U_{\{j\}}^T}{N} \tag{12}$$

This covariance matrix (Equation (12)) shows an effect of $\rho_{\{j\}}$ on the measured value matrix $y_t$. The diagonal element of this covariance matrix is a variance of $\hat{y}_t$. That is, a sensor corresponding to a diagonal element having a large variance in the covariance matrix of the measured value matrix $\hat{y}_t$ when calculating backward from only the singular element of the selected $\rho_t$ is identified as the anomalous part (step S09a).

In the present embodiment, the "predetermined criterion" described in step S06b is defined as, for example, "top three singular elements having a large expected value in the singular elements $\rho_1, \rho_2, \ldots$", or the like. The technical meaning of selecting the singular elements $\rho_1, \rho_2, \ldots$ according to the criterion as described above will be described.

The singular element having a high expected value in the singular elements $\rho_1, \rho_2, \ldots$ constituting the singular element matrix $\rho_t$ is a singular element having a large contribution to an increase in the Mahalanobis distance. That is, it is assumed that the Mahalanobis distance for a certain measured value matrix $y_t$ has increased as a result of anomalies that have occurred in any of the sensors. In this case, in the singular element matrix $\rho_t$ corresponding to the measured value matrix $y_t$, some of the singular elements having a large expected value (for example, the top three)

can be considered to have a greater contribution to the increase in the Mahalanobis distance.

Therefore, when the measured value matrix $y_t(\hat{y}_t)$ is calculated by calculating $\rho_t = S^{-0.5} \cdot U^T \cdot y_t$ backward from p in which only the top three singular elements having a large expected value are selected, only an element of the measured value matrix $\hat{y}_i$ that contributes to the increase of the Mahalanobis distance is extracted in each of the sensor elements (row elements $y_1, y_2, \ldots$) of the measured value matrix $y_t$. By doing so, the diagonal element of the covariance matrix of the measured value matrix $\hat{y}_i$ indicates the variance of the measured values for each of the sensors, and thus, the sensor at which an anomaly has occurred can be estimated in accordance with a portion of the diagonal element having a large value (variance).

Note that for each row of the covariance matrix of the measured value matrix $\hat{y}_t$ (Equation (12)), diagonal superiority may be determined by finding the ratio of the diagonal element to the sum of the absolute values in the row. If the diagonal superiority is determined, it is determined that only the sensor is anomalous, and if the diagonal superiority is not determined, it is determined that the sensor has changed in conjunction with other sensors. For example, if it is determined that the sensor is operating in conjunction with a plurality of sensors, it is possible to diagnose that the sensor itself is not anomalous and a site in association with the sensor may be anomalously deformed.

As described above, the anomalous part identification unit 102 according to the second embodiment selects, based on the predetermined criterion, a singular element from the singular element matrix $\rho_1$ obtained by substituting the measured value matrix $y_t$ into $\rho_t = S^{-0.5} \cdot U^T \cdot y_t$ (Equation A), and identifies the anomalous part based on the diagonal element of the covariance matrix of a measured value matrix $(\hat{y}_t)$ obtained by applying, to Equation A, a singular element matrix $\rho_{t\{j\}}$ of the selected singular element.

In this way, the matrix X calculated in the first embodiment does not need to be calculated, and speed after the calculation is increased.

Modifications of Second Embodiment

In the second embodiment, an example has been described in which the singular elements $\rho_1, \rho_2, \ldots$ having a large expected value affect the measured value and are selected in order of the size of the values, but other embodiments are not limited to this aspect.

For example, the anomaly detecting device 1 according to a modification of the second embodiment may select singular elements having relatively small variances $\sigma_1^2, \sigma_2^2, \ldots$ of the respective singular elements $\rho_1$ and $\rho_2$.

A singular element in a direction with large variance greatly fluctuates each time the measured value is obtained, and thus, noise is considered to be large. Accordingly, the anomalous part can be identified with high accuracy by extracting only the singular elements having small noise and calculating the measured value matrix $\hat{y}_t$ backward.

In the above-described first and second embodiments and the modifications thereof, various processes of the above-described anomaly detecting device 1 are stored on a computer readable recording medium in the form of a program, and the computer reads and executes the program to perform the various processes. Examples of the computer-readable recording medium include magnetic disks, magneto-optical disks, CD-ROMs, DVD-ROMs, and semiconductor memories. This computer program may be distributed to the computer on a communication line, and the computer that receives this distribution may execute the program.

The program may be a program for realizing some of the functions described above. In addition, the functions as described above may be realized in combination with a program already stored on the computer system, namely, a so-called differential file (differential program).

In another embodiment, some of the functional units included in the anomaly detecting device 1 described in the first and second embodiments may be provided by other computers connected by a network.

In the foregoing, certain embodiments of the present disclosure have been described, but all of these embodiments are merely illustrative and are not intended to limit the scope of the disclosure. The embodiments may be implemented in various other forms, and various omissions, substitutions, and alterations may be made without departing from the gist of the disclosure. These embodiments and modifications thereof are included in the spirit and technical scope of the disclosure.

Notes

The anomaly detecting device 1 according to each of the embodiments is construed, for example, in the following manner.

(1) An anomaly detecting device 1 according to a first aspect is an anomaly detecting device that detects an anomaly of an object by referring to a measured value acquired by a plurality of sensors SE1, SE2, . . . , including: an anomaly determination unit 101 configured to determine whether the anomaly is present for a measured value matrix $y_t$ to be evaluated and which is acquired in an arbitrary time period; and an anomalous part identification unit 102 configured to, when it is determined that the measured value matrix $y_t$ is anomalous, identify an anomalous part based on a diagonal element of a matrix obtained in association with the measured value matrix $y_t$.

(2) The anomaly detecting device 1 according to the second aspect is the anomaly detecting device 1 according to (1), further including a singular value decomposition unit configured to perform singular value decomposition of a variance-covariance matrix of a measured value matrix $y_0$ composed of the measured values acquired in a time period considered to be normal, to thereby calculate a singular vector U and a singular value matrix S, in which the anomaly determination unit applies the singular vector U and the singular value matrix S to a measured value matrix $y_t$ to be evaluated and which is acquired in an arbitrary time period to determine whether the anomaly is present from a result of the application.

(3) The anomaly detecting device 1 according to a third aspect is the anomaly detecting device 1 according to (1) or (2), in which the anomalous part identification unit 102 identifies the anomalous part based on a diagonal element of a matrix X represented by $y_t = X \cdot y_0$.

(4) The anomaly detecting device 1 according to a fourth aspect is the anomaly detecting device 1 according to (3), in which the anomalous part identification unit 102 identifies a sensor in which an anomaly has likely occurred by referring to which diagonal element of the matrix X is at a value far from 1.

(5) The anomaly detecting device 1 according to a fifth aspect is the anomaly detecting device 1 according to (3) or (4), in which the anomalous part identification unit 102 identifies the anomalous part by referring to a plurality of the matrices X acquired before determining that the measured value matrix $y_t$ is anomalous.

(6) The anomaly detecting device 1 according to a sixth aspect is the anomaly detecting device 1 according to (2), in which the anomalous part identification unit 102 selects, based on a predetermined criterion, singular elements from a singular element matrix $\rho_t$ obtained by substituting the measured value matrix $y_t$ into $\rho_t = S^{-0.5} \cdot U^T \cdot y_t$ (Equation A), and identifies the anomalous part based on a diagonal element of a covariance matrix of a measured value matrix ($\hat{y}_t$) obtained by applying, to Equation A, a singular element matrix $\rho_{t\{j\}}$ composed of the selected singular elements.

(7) The anomaly detecting device 1 according to a seventh aspect is the anomaly detecting device 1 according to (6), in which the anomalous part identification unit 102 selects one of the singular elements included in the singular element matrix $\rho_t$ that has a relatively large expected value of the singular element.

(8) The anomaly detecting device 1 according to an eighth aspect is the anomaly detecting device 1 according to (6) or (7), in which the anomalous part identification unit 102 selects one of the singular elements included in the singular element matrix $\rho_t$ that has a relatively small singular value.

(9) The anomaly detecting device 1 according to a ninth aspect is the anomaly detecting device 1 according to any one of (6) to (8), in which the anomalous part identification unit 102 estimates the sensor in which an anomaly has occurred in accordance with a portion of the diagonal element having a relatively large value in the measured value matrix ($\hat{y}_t$).

(10) An anomaly detection method according to a tenth aspect is an anomaly detection method for detecting an anomaly of an object by referring to measured values acquired by a plurality of sensors, the anomaly detection method including: calculating a singular vector U and a singular value matrix S by performing singular value decomposition of a variance-covariance matrix of a measured value matrix $y_0$ composed of the measured values acquired in a time period considered to be normal; determining whether the anomaly is present from the result of applying the singular vector U and the singular value matrix S to a measured value matrix $y_t$ to be evaluated and which is acquired in an arbitrary time period; and, when it is determined that the measured value matrix $y_t$ is anomalous, identifying an anomalous part based on a diagonal element of a matrix obtained in association with the measured value matrix $y_t$.

(11) A program according to an eleventh aspect is a program for causing an anomaly detecting device that detects an anomaly of an object by referring to measured values acquired by a plurality of sensors to execute: calculating a singular vector U and a singular value matrix S by performing singular value decomposition of a variance-covariance matrix of a measured value matrix $y_0$ composed of the measured values acquired in a time period considered to be normal; determining whether the anomaly is present from the result of applying the singular vector U and the singular value matrix S to a measured value matrix $y_t$ to be evaluated and which is acquired in an arbitrary time period; and, when it is determined that the measured value matrix $y_t$ is anomalous, identifying an anomalous part based on a diagonal element of a matrix obtained in association with the measured value matrix $y_t$.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. An anomaly detecting device configured to detect an anomaly of an object by referring to measured values acquired by a plurality of sensors, the anomaly detecting device comprising:
   an anomaly determination unit configured to determine whether the anomaly is present for a measured value matrix $y_t$ to be evaluated and which is acquired in an arbitrary time period; and
   an anomalous part identification unit configured to, when the measured value matrix $y_t$ is determined to be anomalous, identify an anomalous part based on a diagonal element of a matrix X represented by $y_t = X \cdot y_0$.

2. The anomaly detecting device according to claim 1, wherein
   the anomalous part identification unit is configured to identify one of the plurality sensors in which the anomaly has likely occurred by referring to which diagonal element of the matrix X is at a value far from 1.

3. The anomaly detecting device according to claim 1, wherein
   the anomalous part identification unit is configured to identify the anomalous part by referring to a plurality of the matrices X acquired before determining that the measured value matrix $y_t$ is anomalous.

4. An anomaly detecting device configured to detect an anomaly of an object by referring to measured values acquired by a plurality of sensors, the anomaly detecting device comprising:
   an anomaly determination unit configured to determine whether the anomaly is present for a measured value matrix $y_t$ to be evaluated and which is acquired in an arbitrary time period;
   an anomalous part identification unit configured to, when the measured value matrix $y_t$ is determined to be anomalous, identify an anomalous part based on a diagonal element of a matrix obtained in association with the measured value matrix $y_t$; and
   a singular value decomposition unit configured to perform singular value decomposition of a variance-covariance matrix of a measured value matrix $y_0$ composed of the measured values acquired in a time period considered to be normal, to thereby calculate a singular vector U and a singular value matrix S,
   wherein:
   the anomaly determination unit is configured to apply the singular vector U and the singular value matrix S to the measured value matrix $y_t$ to determine whether the anomaly is present from a result of application; and
   the anomalous part identification unit is configured to select, based on a predetermined criterion, singular elements from a singular element matrix $\rho_t$ obtained by substituting the measured value matrix $y_t$ into $\rho_t = S^{-0.5} \cdot U^T \cdot y_t$ (Equation A), and identify the anomalous part based on a diagonal element of a covariance matrix of a measured value matrix ($\hat{y}_t$) obtained by applying, to Equation A, a singular element matrix $\rho_{t\{j\}}$ composed of the singular elements that have been selected.

5. The anomaly detecting device according to claim 4, wherein
   the anomalous part identification unit is configured to select one of the singular elements included in the singular element matrix $\rho_t$ that has a relatively large expected value of the singular element.

6. The anomaly detecting device according to claim 4, wherein
the anomalous part identification unit is configured to select one of the singular elements included in the singular element matrix $\rho_t$ that has a relatively small singular value.

7. The anomaly detecting device according to claim 4, wherein
the anomalous part identification unit is configured to estimate one of the plurality of sensors in which the anomaly has occurred in accordance with a portion of the diagonal element having a relatively large value in the measured value matrix $(\hat{y}_t)$.

8. An anomaly detection method for detecting an anomaly of an object by referring to measured values acquired by a plurality of sensors, the anomaly detection method comprising:
determining whether the anomaly is present for a measured value matrix $y_t$ to be evaluated and which is acquired in an arbitrary time period; and
when the measured value matrix $y_t$ is determined to be anomalous, identifying an anomalous part based on a diagonal element of a matrix X represented by $y_t = X \cdot y_0$.

* * * * *